XR 3,809,806

United States Patent

[11] 3,809,806

Walker et al.

[45] May 7, 1974

[54] BANDING CORRECTION SYSTEM FOR FILM RECORDING APPARATUS

[75] Inventors: Robert Walker, Stamford; William Harris, Oxford, both of Conn.

[73] Assignee: Columbia Broadcasting System Inc., New York, N.Y.

[22] Filed: Oct. 18, 1972

[21] Appl. No.: 298,607

[52] U.S. Cl. ............ 178/7.6, 178/6.7 R, 178/6.7 A, 178/DIG. 28, 346/108, 350/7, 350/285

[51] Int. Cl. ......................... G02b 17/00, H04n 5/84

[58] Field of Search ............... 178/7.6, 6.7 R, 6.7 A, 178/DIG. 28; 350/7, 285; 346/108

[56] References Cited

UNITED STATES PATENTS

| | | | |
|---|---|---|---|
| 3,646,568 | 2/1972 | Woywood | 350/7 |
| 3,686,437 | 8/1972 | Leonard | 178/7.6 |
| 3,461,227 | 8/1969 | Perreault | 178/6 |

*Primary Examiner*—Howard W. Britton
*Attorney, Agent, or Firm*—Martin Novack; Spencer E. Olson

[57] ABSTRACT

The disclosure pertains to an apparatus for recording an image on a film in a scanned horizontal line pattern with a light beam, the scanned pattern being achieved by reflecting the light beam from a moving surface such as an optical spinner. There is disclosed a subsystem for improving the vertical registration of successive lines in the pattern. Means are provided for sensing the beam position at the beginning of a scanline and for developing a position-indicative signal which varies in accordance with the relative vertical position of the beam. The position-indicative signal is compared to a predetermined reference signal which is a function of the desired position of the beam and there is generated a correction signal which depends on the comparison. Further means are provided for vertically deflecting the beam in accordance with the correction signal.

5 Claims, 5 Drawing Figures

3809806
NO OR CLASSIF

BANDING CORRECTION SYSTEM FOR FILM RECORDING APPARATUS

BACKGROUND OF THE INVENTION

This invention relates to apparatus for recording an image on a film in a scanned line pattern with a light beam and, more particularly, to a system for improving the vertical registration of successive lines in such a pattern.

Various systems have been developed which utilize a laser beam for reading or recording data on film. For example, an unmodulated laser beam can be scanned over a film at a precisely controlled rate and the transmitted portion of the beam measured by a photodetector. The varying optical densities of the different areas of the film act to amplitude modulate the laser beam and the photodetector output generates a video signal representative of the film data. The video signal can be transmitted to a remote location and the original film data reproduced using a recorder apparatus. In the recorder, the video signal is used to amplitude modulate a laser beam which is scanned at a precise rate over unexposed film. In this manner, the original film information can be reproduced at the remote location.

One common type of recorder system employs a multi-faceted spinning mirror or prism to achieve image reproduction. In these systems the image is reconstructed on the film by causing the focused laser beam to traverse the medium in a closely spaced horizontal scanline pattern. Typically, each facet of the spinner is utilized to form a single scanline on the film. While the spinner rotates, the film is moved at a proportional speed in a direction approximately parallel to the spinner's axis of rotation. The image is thus reconstructed as a series of horizontal scanlines of nominally uniform spacing whose intensity is appropriately modulated to generate the two-dimensional image.

A common problem encountered in systems of the type described arises from periodic imperfections in the spacing of successive horizontal scanlines. Generally, these problems result from imperfections in the moving portions of the optical system, e.g., the optical spinner. For example, facet-to-facet variations of the angle which each spinner facet makes with the spinner axis of rotation causes corresponding variations to occur in the spacing of successive scanlines. Such facet-to-facet variations can result from fabrication errors in the alignment of the spinner facets or from wobbling of the spinner during operation.

Generally, most variations in scanline spacing are regular in nature, having a fundamental period of one cycle per mirror revolution. Such variations produce a corresponding perturbation of the ultimate image exposure, the exposure being increased where the spacing is less than average and decreased where the spacing is greater than average. In areas of the image that would normally have uniform intensity, these variations are manifested as a succession of light and dark bands oriented parallel to the direction of scan. This "banding" phenomenon causes an unpleasing cosmetic degradation of the image. More importantly, by obscuring actual image content, the banding lowers the effective resolution capabilities of the apparatus.

It is therefore an object of the present invention to improve the vertical registration of successive scanlines in the type of apparatus described.

SUMMARY OF THE INVENTION

The present invention pertains to an apparatus for recording an image on a film in a scanned horizontal line pattern with a light beam, the scanned pattern being achieved by reflecting the light beam from moving optics such as an optical spinner. The invention comprises a system for improving the vertical registration of successive lines in the pattern. Means are provided for sensing the beam position during the scanline and for developing a position-indicative signal which varies in accordance with the relative vertical position of the beam. Further means are provided for comparing the position-indicative signal to a predetermined reference signal which is a function of the desired position of the beam and for generating a correction signal which depends on the comparison. Finally, means are provided for vertically deflecting the beam in accordance with the correction signal.

In one embodiment of the invention, comparisons are taken before actual operation of the system and a series of correction signals are preprogrammed for the system, there being a programmed correction signal for each facet of the optical spinner. In this embodiment, an operator observes the characteristic errors associated with each facet of the spinner and establishes appropriate correction signals in accordance with observed deviations of the position-indicative signals for successive scanlines.

In another embodiment of the invention, a new correction signal is developed for each scanline, the correction being automatically generated on a dynamic basis.

Further features and advantages of the invention will become more readily apparent from the following detailed description when taken in conjunction with the accompanying drawings.

DESCRIPTION OF THE PREFERRED EMBODIMENTS

Figure 1:
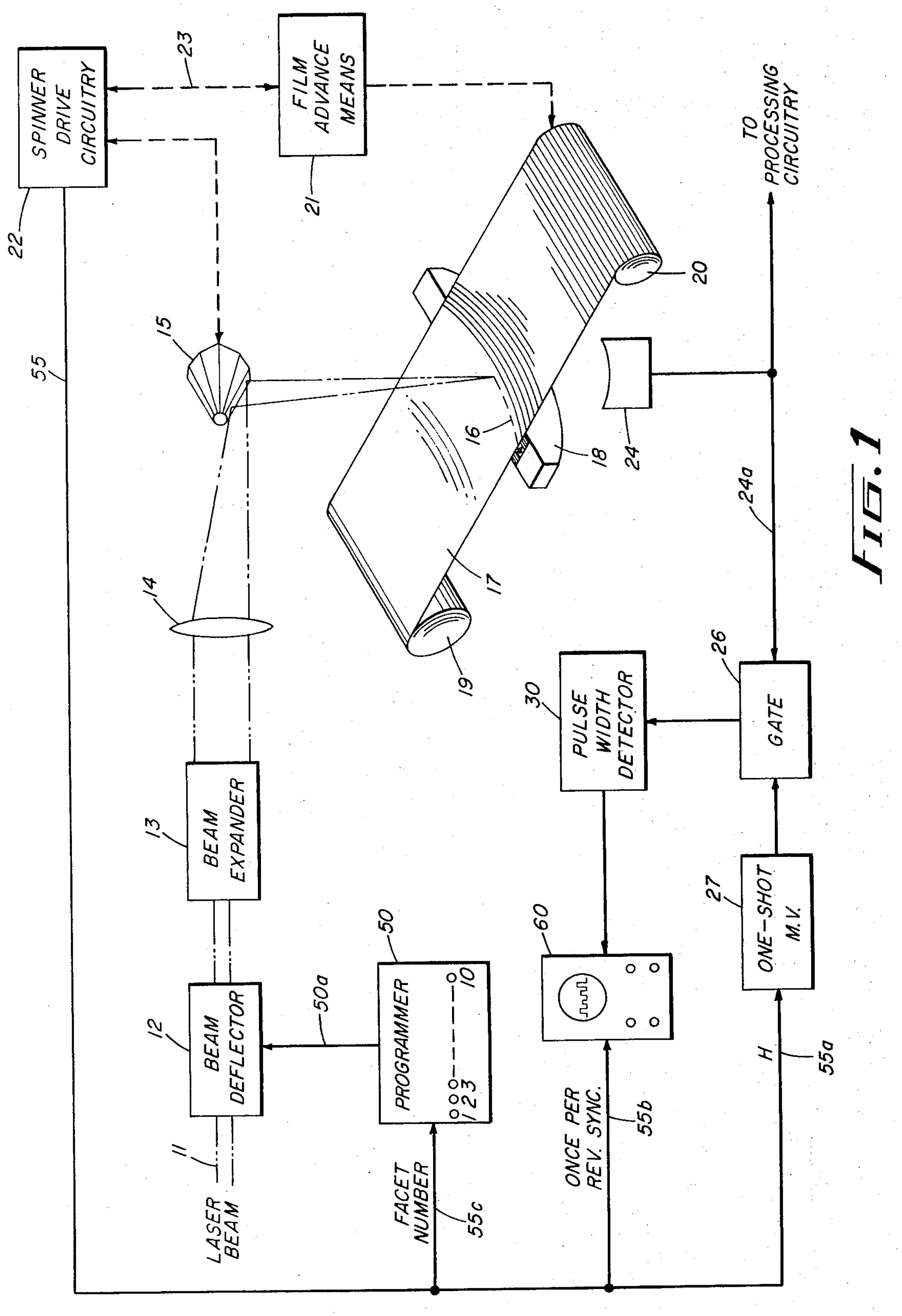
FIG. 1 is a schematic diagram, largely in block form, of portions of a film recording apparatus which include the system of the invention.

Referring to FIG. 1, there is shown a film recording apparatus which includes the vertical registration improvement system of the present invention. An intensity modulated laser beam 11 is passed in succession through an electro-optic beam deflector 12, a beam expander 13, and focusing optics represented pictorially by the lens 14. The beam is reflected off an optical spinner 15 and is focused at a spot along an arc shown as dashed line 16. A film 17 is positioned coincident the arc 16 and held in position by a curved film bridge 18. The film is advanced from a supply roll 19 to a takeup roll 20 by film advance means represented by the block 21. The film advance is conventionally synchronized with the spinner 15 such that each facet of the spinner is utilized to form a single scan-line on the film. The spinner 15, which in the present embodiment is a ten-facet spinner, is controlled by conventional spinner drive circuitry 22, the synchronization between the spinner and film being represented by the dashed line 23.

After passing through the film 17, the light beam is received by a photodetector 24 which is coupled to appropriate processing circuitry (not shown). During recording, the input laser beam is amplitude modulated with a video signal and used to selectively expose the film 17. The output of photodetector 24 is used to monitor the amplitude of the laser beam passed through the film. The elements as recited thus far, with the exception of the beam deflector 12, are conventionally utilized in prior art systems to achieve recording in the manner described.

Figure 2:
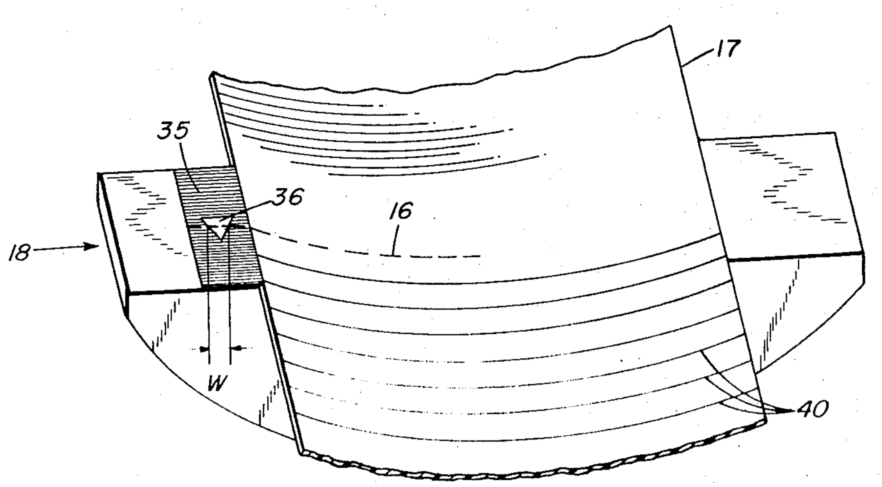
FIG. 2 is an elevational view of a film bridge in accordance with the invention.

Referring to FIG. 2 there is shown an elevational view of the film bridge 18 having the film 17 thereon. The horizontal scanlines 40 already recorded on the film by left-to-right sweeps of the light beam are shown with exaggerated separation for clarity, the present scanline being represented by the dashed line 16. As is seen from the dashed line 16 in the Figure, the scanning length is longer than the film is wide; i.e., the actual scan starts on the opaque margin of the film bridge 18, the margin being designated by the reference numeral 35. The "banding" problem of the prior art occurs when the relative vertical position of the line being scanned is misregistered with respect to previously recorded scanlines. As described in the background, this can result from inaccuracies in the spinner facet surfaces or spinner motion and will most often be manifested in a manner that reflects the periodicity of the spinner; viz., a period of ten scanlines for the present embodiment. Located in the opaque left margin area 35 of the present embodiment is a transmissive triangular "window" or wedge 36. The wedge is oriented such that the width of the wedge traversed by the scanning beam, designated as $w$, varies linearly with the vertical position of the scanning beam at the margin 35. When the beam traverses the transparent wedge, the photodetector output will generate a positive-going pulse that has a duration which depends on the width $w$ and thus depends on the relative vertical position of the beam. In addition to being coupled to conventional processing circuitry, the output of photodetector 24 is coupled via a line 24*a* to one input of a gate 26 (FIG. 1). The "enable" input of the gate 26 receives the output of a one-shot multivibrator 27 which is triggered by the horizontal drive signal, H, available on a conductor 55*a*. The signal H is developed by the spinner drive circuitry 22 at the beginning of each horizontal scanline (i.e., at the time that a new spinner facet first comes into play). The conductor 55*a* is one of a group of conductors which comprise the cable 55 that carries various signals from the spinner drive circuitry 22. The one-shot 27 develops a short enabling pulse of about five microseconds at the beginning of each horizontal scanline. This duration corresponds approximately to the time that it takes the scanning beam to traverse the margin 35 of the film bridge 18. When the output of one-shot 27 is present, the photodetector output on line 24*a* is passed by gate 26 to a pulse width detector 30.

The pulse width detector 30 generates an output voltage pulse of constant width that is proportional in amplitude to the duration of a received input pulse. As indicated above, the duration of the pulse on line 24*a* depends on the relative vertical position of the scanning beam, so the voltage output of detector 30 likewise is a function of the beam's relative vertical position. The output of detector 30 is coupled to an oscilloscope 60 which receives at its sync input a signal from the spinner drive circuitry over a line 55*b*. This synchronizing signal is a once-per-revolution signal that is generated each time the spinner 15 completes a full revolution.

Figure 3:
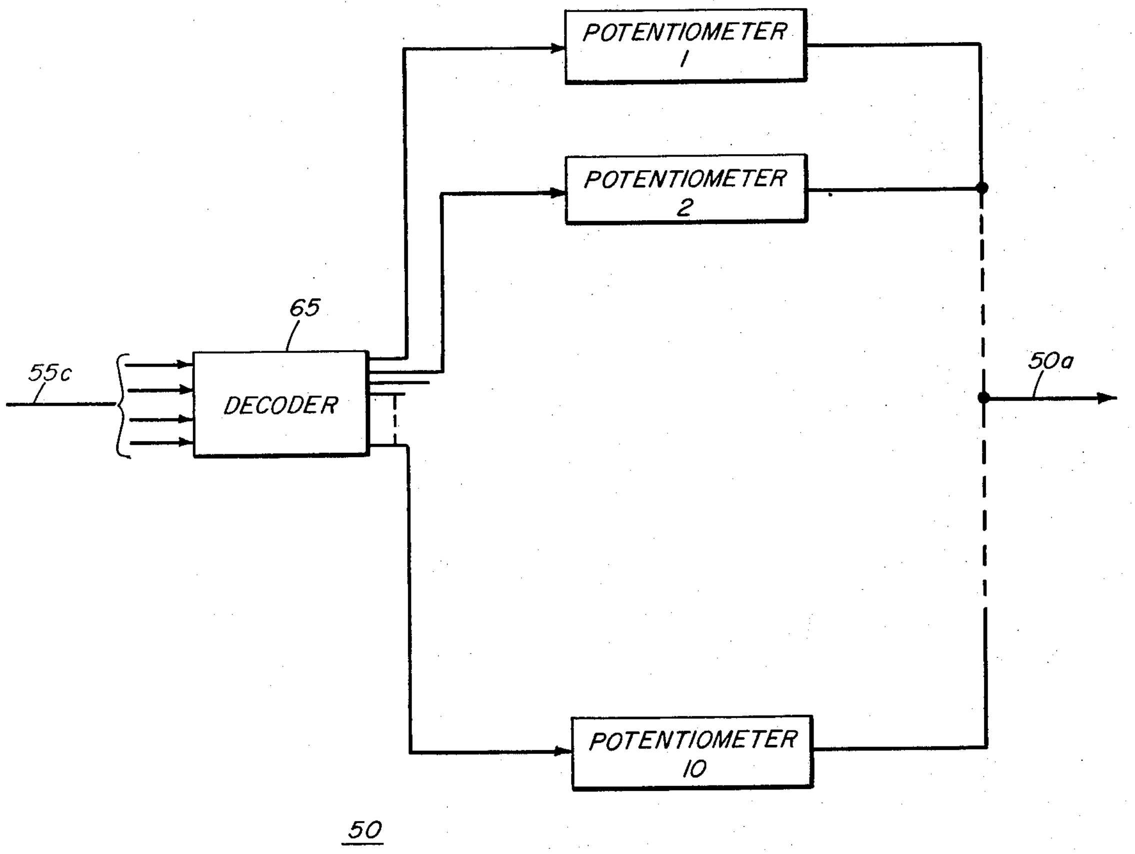
FIG. 3 is a block diagram of the facet programmer portion of the embodiment of FIG. 1.

Further provided in the embodiment of FIG. 1 is a facet programmer 50 which receives digital signals from the spinner drive circuitry over a line 55*c*. The line 55*c* typically contains four conductors that carry four bits of information which represent, in binary form, the assigned number of the particular facet of spinner 15 that is presently scanning the laser beam on the film. It will be appreciated, however, that any known means of monitoring the designation of the active facet could be used. The programmer 50 is shown in further detail in FIG. 3 and is seen to comprise a decoder 65 which receives the binary bits via line 55*c* and generates a voltage level on one of ten output lines, depending on which spinner facet is presently active. These ten output lines from decoder 65 are coupled to ten potentiometers designated as "potentiometer 1" through "potentiometer 10." The potentiometers are operator adjustable to attenuate the voltage level produced by decoder 65 down to a desired level. The potentiometer outputs are coupled to a common output line 50*a* which is coupled to the input of the beam deflector 12 (FIG. 1). The signal on line 50*a* is used to control the amount by which the beam is deflected in the vertical direction. Each potentiometer is seen to affect the beam only during the activity of a single spinner facet (e.g., potentiometer 1 controls operation during facet 1, potentiometer 2 controls operation during facet 2, and so on).

Figure 4:
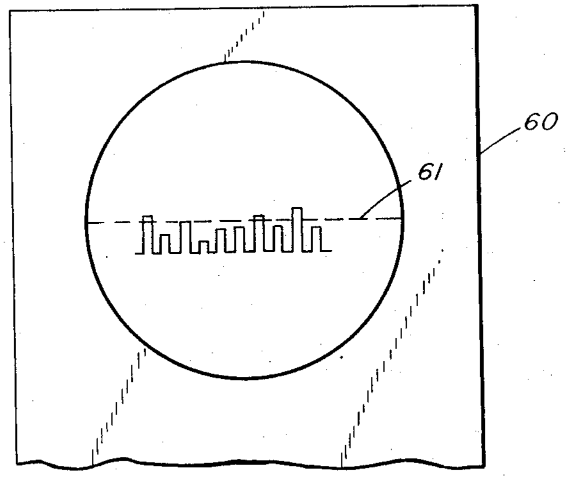
FIG. 4 illustrates a typical oscilloscope display that is obtained when utilizing the embodiment of FIG. 1.

In the embodiment of FIG. 2, the potentiometers are programmed to minimize vertical registration errors before operation of the system. This is done by adjusting the individual potentiometers to obtain the same relative vertical scan position from each of the ten facets of the spinner. FIG. 4 illustrates the typical oscilloscope display that is obtained when the output of detector 30 is displayed on the oscilloscope 60 before adjustment of the potentiometers. It is seen that the scope, when properly synchronized, displays ten pulses, each having a height that is related to the relative vertical beam position that results from scanning by a particular one of the spinner facets. A vertical position adjustment can be effected for any particular facet by adjusting its associated potentiometer. For example, potentiometer 3 will effect only scanlines that are obtained using facet number 3 of the spinner. Similarly, all ten potentiometers affect the beam deflector during operation of their corresponding spinner facets. By adjusting the potentiometers the heights of the pulses in FIG. 4 can be equalized, for example at a level shown by the dashed line 61 in the Figure. Such equalization means that the relative vertical scanline positions caused by each of the ten facets is the same, as is desired. The "programming" therefore involves adjustment of the potentiometers to yield uniform line spacings by equalizing the vertical positions of scanlines from the different facets of the spinner.

Figure 5:
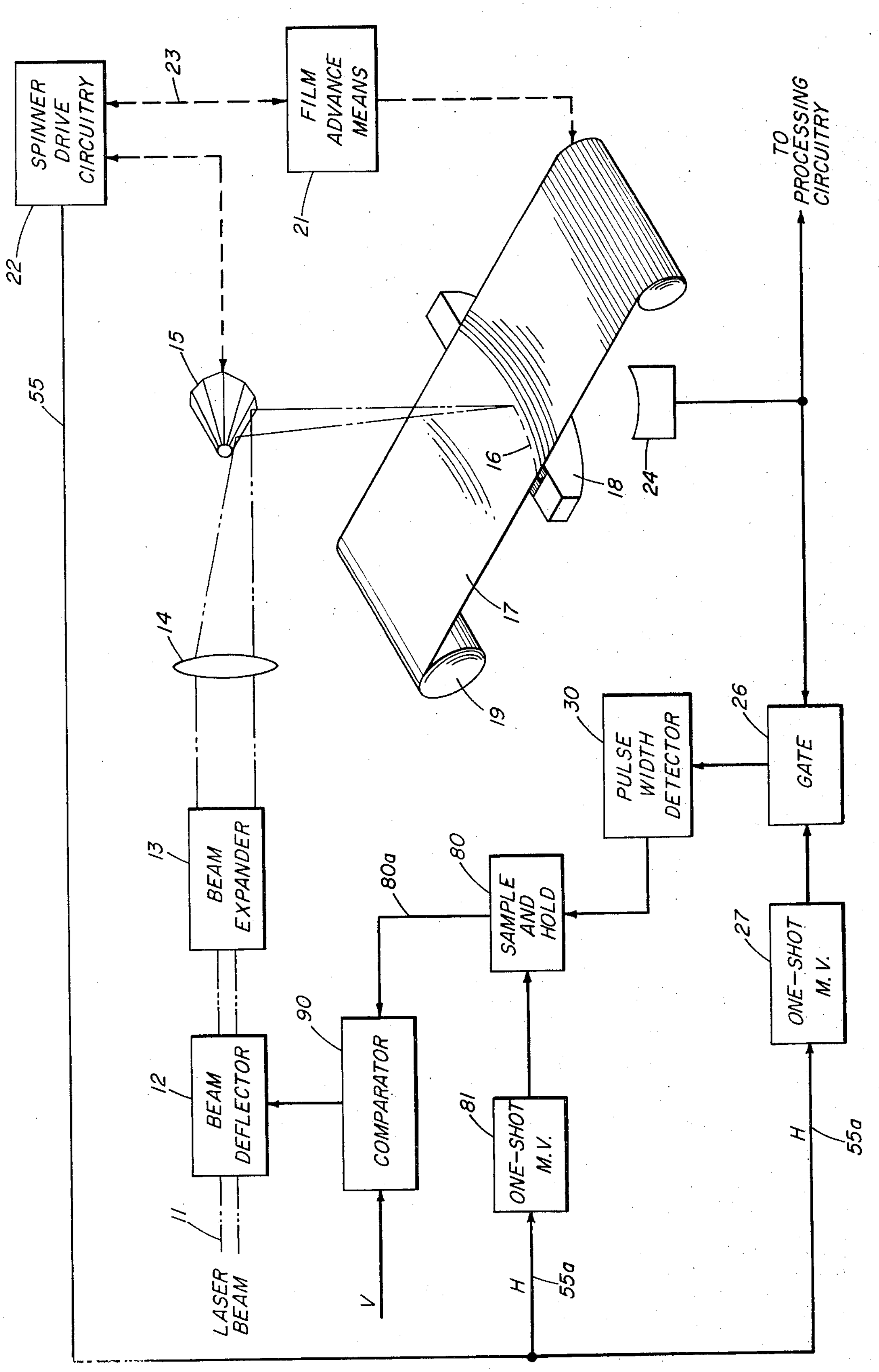
FIG. 5 is a schematic diagram, largely in block form, of a portion of a film recording apparatus that includes another embodiment of the invention.

Referring to FIG. 5, there is shown another embodiment of the invention. The previously described embodiment of FIG. 1 requires "programming" of the individual facets and operates under the assumption that, over a reasonable period of time, the individual spinner facets will operate in a relatively consistent manner. If this assumption is realistic (and it has been found to be generally true in practice), then the preprogramming will have beneficial effect that lasts for a reasonable time and does not require frequent bothersome reprogramming. The embodiment of FIG. 5 has the advantage of not requiring preprogramming and of automatically compensating for any changes in the optical system (usually, the spinner) that occur during operation. In this embodiment the output of pulse width detector 30 is coupled to a sample and hold circuit 80. Sampling is synchronized to occur just after the pulse width detector 30 has developed a voltage level for the present scanline. This is achieved by triggering the sampling operation with the trailing edge of the output of a six microsecond one-shot multivibrator 81 which is, in turn, triggered by H. The circuit 80 holds the sampled output of pulse width detector 30 for the remainder of a horizontal scanline. The held voltage, on line 80*a*, is received as one input to a comparator 90, the other input to which is a predetermined reference voltage, V. The output of the comparator is coupled to the beam deflector 12.

Operation of the embodiment of FIG. 5 is as follows: The passage of the scanning beam over the wedge 36 (FIG. 2) results, as described above, in the generation of a voltage level by detector 30, the voltage level being a function of the beam's vertical position. This level is held for the duration of the horizontal scanline and compared, by comparator 90, to reference voltage V which corresponds to the voltage that would be generated by the circuit 80 for a predetermined fixed vertical position of the beam with respect to the wedge. The output of the comparator will therefore have a magnitude and polarity that depend upon the actual initial position of the beam with respect to the predetermined fixed position. This output then controls the beam deflector to correct the vertical beam position during the time the beam is scanning the film to a position that coincides with the fixed position. Uniform line spacing is again achieved by equalizing the vertical positions of scan-lines from the different facets of the spinner. In this embodiment, however, the correction is dynamic in nature (rather than preprogrammed) since the beam position is effectively examined at the start of each horizontal scan and corrected during each individual scanline. Therefore, changes in the characteristics of the optical system that would effect vertical position during operation are automatically taken into account.

The invention has been described with reference to specific embodiments, but it will be appreciated that variations therefrom within the spirit of the invention will occur to those skilled in the art. For example, although the embodiment of FIG. 5 is shown as operating in an apparatus that employs an optical spinner, it should be clear that the invention would apply equally well for the other types of optical scanning means. As a further example, the optical window or wedge 36 could take on other forms such as a non-transmissive wedge in a transmissive margin.

We claim:

1. In an apparatus for recording an image on a film in a scanned horizontal line pattern with a modulated light beam, the scanned pattern being achieved using a multi-faceted optical spinner, each facet of the spinner operating to generate an individual horizontal scanline, the film being advanced in a vertical direction over a film bridge that defines a scanning position, said apparatus including a photodetector for monitoring the beam after its passage through the scanning position; a system for improving the vertical registration of successive lines in the pattern, comprising:

- an optical window in said film bridge at the scanning position, said window receiving the beam at the beginning of each horizontal scanline;
- means responsive to the output of said photodetector for measuring the time of traversal of said window by said beam and for generating a position-indicative signal as a function of the measured time;
- means for comparing said position-indicative signal to a predetermined reference signal which is a function of the desired position of the beam and for generating a correction signal which depends on the comparisons; and
- an electro-optical deflection means for deflecting the beam in accordance with the correction signal.

2. In an apparatus for recording an image on a film in a scanned horizontal line pattern with a modulated light beam, the scanned pattern being achieved using a multi-faceted optical spinner controlled by a spinner drive control, each facet of said spinner operating to generate an individual horizontal scanline, the film being advanced in a vertical direction over a film bridge that defines a scanning position, said apparatus including a photodetector for monitoring the beam after its passage through the scanning position; a system for improving the vertical registration of successive lines in the pattern, comprising:

- an optical window in said film bridge at the scanning position, said window receiving the beam at the beginning of each horizontal scanline;
- means responsive to the output of said photodetector for measuring the time of traversal of said window by said beam and for generating a position-indicative signal as a function of the measured time;
- means for displaying position-indicative signals for a number of successive horizontal scanlines;
- programmable means synchronized with said spinner drive control for establishing a plurality of correction signals in accordance with the displayed signals, one correction signal being associated with each spinner facet; and
- electro-optical deflection means for vertically deflecting the beam in response to said correction signals.

3. In an apparatus for recording an image on a film in a scanned horizontal line pattern with a light beam, the scanned pattern being achieved by reflecting a light beam from a moving optical means, a system for improving the vertical registration of successive lines in the pattern comprising:

- means for sensing the beam position during a scanline and for developing a position-indicative signal which varies in accordance with the relative vertical position of the beam, the beam position sensing means including an optical window in the path of the beam, said window having a horizontal dimension that varies as a predetermined function of vertical position;

means for comparing said position-indicative signal to a predetermined reference signal which is a function of the desired position of the beam and for generating a correction signal which depends on the comparison; and means for vertically deflecting the beam in accordance with the correction signal.

4. A system as defined by claim 3 wherein said means for vertically deflecting the beam comprises an electro-optic beam deflector which receives the correction signal.

5. A system as defined by claim 3 further comprising means for enabling said beam position sensing means at the beginning of each horizontal scanline.

* * * * *